March 7, 1939.　　　J. R. GARDNER　　　2,149,394
ALIGNING DEVICE FOR WELDING CASINGS
Filed Dec. 27, 1937
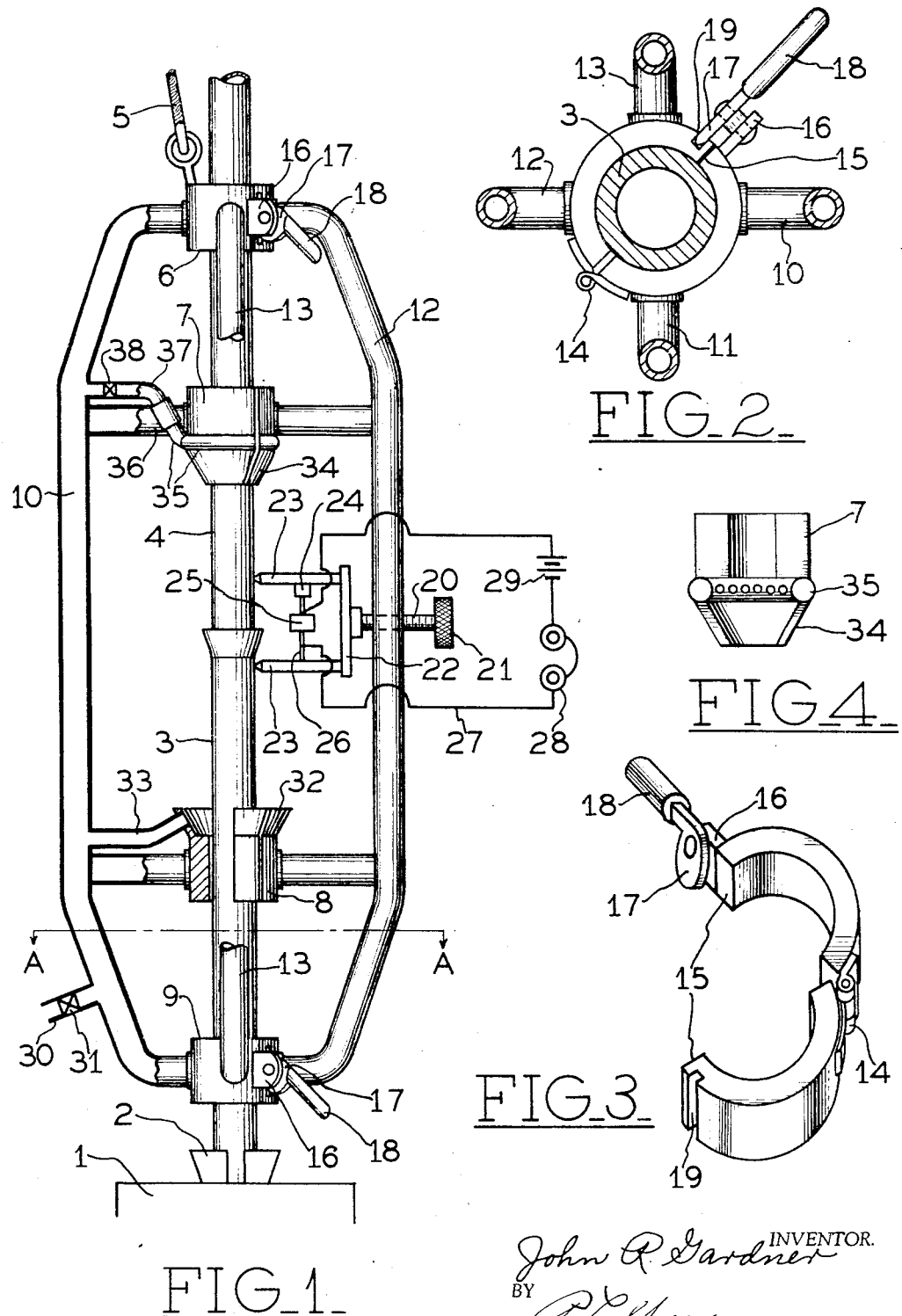

Patented Mar. 7, 1939

2,149,394

UNITED STATES PATENT OFFICE 2,149,394

ALIGNING DEVICE FOR WELDING CASINGS

John R. Gardner, Alvin, Tex.

Application December 27, 1937, Serial No. 181,967

2 Claims. (Cl. 219—18)

The present invention is directed to a device for aligning pipes, particularly, vertically arranged pipes, during a welding operation.

In the welding of vertically arranged piping, as for example the pipes that constitute the casing for an oil well, it is a matter of vital importance to insure perfect alignment of the several lengths of pipe. In drilling for oil a borehole several thousand feet in depth is drilled. The casing is increased in length in stages while it is being introduced into the borehole by welding on additional lengths to the top of it. It is apparent that when the casing becomes several thousand feet long, any minute misalignment of individual sections will set up unusual stresses in the weld joints causing them to fail. Casings have broken innumerable times for this reason and such breaks are extremely costly.

It is the principal object of the present invention to provide a device which can be suspended on the rigging of an oil well and which is so constructed that when it is applied to the pipe on each side of the joint to be welded it will infallibly align the pipes.

It is a further object of this invention to provide a device of the character described which will be simple in construction and foolproof in operation.

Another object of the present invention is the provision of a device, of the character described, in which is included means for indicating any weakness in the welded joint.

An additional object of the present invention is the provision of a device of the character described embodying a framework so constructed that a fabric can be supported on it to form a tent to shield workmen from the welding arc.

Another object of the present invention is provision of a device of the character described embodying means for cooling the lower tubular member below the weld joint so as to limit the sphere of action of the welding arc and means for evenly quenching the weld joint at the end of the welding operation.

Further objects and advantages of the present invention will appear from the following detailed description of the accompanying drawing, in which Figure 1 is a front elevation of the device of the present invention in position on a casing to be welded.

Figure 2 is a cross section along line A—A of Figure 1; and

Figure 3 is a detail of the latch constituting part of the device.

Figure 4 is an inside view of one half of a clamping member provided with quenching means.

Referring to the drawing in detail, numeral 1 designates a rotary table in which are arranged slips or clamping members 2, which hold a well casing 3 to which is to be welded a length of casing 4. The length of casing 4 is suspended from a block not shown which is operated by the drawworks of the drilling rig.

Suspended from a cable 5, which may be operated from the cathead on the draw-works in the known manner, is the aligning device of the present invention which consists primarily of a plurality of coaxial ring members 6, 7, 8 and 9 of the same diameter, connected together by longitudinal strengthening members 10, 11, 12 and 13, which may have any desired configuration. In the embodiment shown, these strengthening members are so shaped that canvas can be wrapped about them to form a tent under which the welding operation is performed.

Each ring member has a hinge 14 on one side and abutting surfaces 15 on its other side. Fixed on the outer face of the ring adjacent one abutting surface is an outwardly extending plate 16 to which is pivoted a cam shaped member 17 having a handle 18. On the outer face of the ring member adjacent the other abutting surface is a groove 19 adapted to receive one edge of the cam shaped member 17. Preferably, the groove 19 embraces a relatively large portion of the surface of the cam member so that the cam member cannot be pushed into place unless the ring member is completely closed.

Thus it can be seen that in the device of the present invention there are a plurality of spaced members which are rigidly held in alignment by longitudinal members. These spaced members are hinged so that they can be wrapped around the casing already in the well and the length of casing which is to be added. Finally, means are provided for latching these spaced members, said means being of such nature that latching cannot be effected unless all of the spaced members are fully closed. Since these spaced members, because of the relation they bear to each other, cannot be fully closed unless casing 4 is in alignment with casing 3, it follows that the latchability of these members conclusively demonstrates that the casing members to be welded together are in alignment.

Longitudinal member 12 carries a screw 20 having a turn knob 21 at its outer end and having at its inner end a plate 22 carrying a pair of spaced pointed prongs 23. When the weld has been completed and is still hot these prongs are forced into the surfaces of the respective lengths of casing. One prong carries a block of insulation 24 to which is attached an ordinary carbon microphone 25 which is also connected to the other prong by a rod 26. A lead 27 is taken off each side of the carbon microphone to a pair of headphones 28, a battery 29 being arranged in one of said leads. With the prongs 23 embedded in the respective lengths of casing the completed weld joint is quenched. Any checking of the metal in the joint will be audible to the operator who wears the headphones. Likewise, any slippage in the joint will result in the scraping of the lower prong over the surface of the lower length of casing, thereby creating a characteristic sound which can be detected by the operator.

Supporting member 10 is hollow and is provided at its lower end with a water inlet 30 controlled by valve 31. Ring member 8 is provided with an upwardly directed outwardly flared skirt 32 which is connected to hollow member 10 by a tube 33. The purpose of this arrangement is to provide a reservoir of cooling liquid around casing 3 just below the weld joint so that the portion of the casing which is subjected to the weakening influence of heat is restricted.

Ring member 7 is provided with a downwardly-extending, inwardly-directed skirt 34, the smallest diameter of which is only slightly larger than the diameter of casing 4, whereby a small annular passage is formed between the skirt and casing 4. Formed in the lower end of ring member 7 and at the upper end of the skirt 34 is a spray nozzle 35. This nozzle is formed in two sections, one for each half of the ring member, and each section is connected by a rubber sleeve 36 to a tube 37 which has fluid connection with member 10. A valve 38 is provided in tubular member 37.

When the weld joint is completed the valve 38 is opened and cooling liquid is sprayed into the skirt 34 by the spray nozzle 35. The narrow annular passage between the skirt and the casing 4 forms a thin even film of water around casing 4. Thus, the weld joint is quenched uniformly, whereby danger of rupture due to uneven contraction is eliminated.

It is apparent that many changes can be made in the construction illustrated without departing from the basic principle upon which the present invention is based. The size and shape of the various elements can be changed at will. The number of points at which the aligning member makes contact with the respective lengths of casing to be aligned is a matter of choice, it being essential only that there be contact on each length of casing at points sufficiently spaced so that any misalignment of the casing will prevent the latching of the ring members on the aligning device. In addition, the two halves of the aligning device need not be hinged together, but can be separate parts with a second latching device substituted for the hinge.

The nature and objects of the present invention having been thus described and illustrated what is claimed as new and useful and is desired to be secured by Letters Patent is:

1. An aligning device for tubular members to be welded together in a vertical position comprising a plurality of clamping members adapted to be clamped on said tubular members and opened for removal therefrom, each of said clamping members being so constructed as to be concentric with the tubular member with which it is clamped, a plurality of rigid supporting members spaced radially from said clamping members and rigidly connected thereto for holding them, when closed, in fixed, spaced, coaxial relation for engagement with both of said tubular members simultaneously with the junction of said tubular members intermediate said clamping members, said supporting members being of such a configuration as to provide a free working space completely around said junction whereby the weld may be completed while the clamping members are in clamped position, and means including a latch, for closing said clamping members so constructed as to be operative only when said members are in fully closed position.

2. An aligning device according to the preceding claim in which one of said clamping members is adapted to be arranged on the upper tubular member immediately above the junction of said tubular members and carries means for distributing a stream of cooling liquid around the circumference of said tubular member.

JOHN R. GARDNER.